(12) United States Patent
Byun et al.

(10) Patent No.: US 11,564,098 B2
(45) Date of Patent: Jan. 24, 2023

(54) METHOD AND APPARATUS FOR ACTIVATING SECURITY AND CHANGING PDCP VERSION

(71) Applicant: LG Electronics Inc., Seoul (KR)

(72) Inventors: Bokyung Byun, Seoul (KR); Youngdae Lee, Seoul (KR); Geumsan Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 16/638,661

(22) PCT Filed: Oct. 11, 2018

(86) PCT No.: PCT/KR2018/011972
§ 371 (c)(1),
(2) Date: Feb. 12, 2020

(87) PCT Pub. No.: WO2019/074297
PCT Pub. Date: Apr. 18, 2019

(65) Prior Publication Data
US 2021/0136584 A1   May 6, 2021

Related U.S. Application Data

(60) Provisional application No. 62/571,165, filed on Oct. 11, 2017.

(51) Int. Cl.
*H04W 12/106* (2021.01)
*H04W 4/40* (2018.01)
(Continued)

(52) U.S. Cl.
CPC ........... *H04W 12/106* (2021.01); *H04W 4/40* (2018.02); *H04W 12/041* (2021.01); *H04W 76/27* (2018.02); *H04W 80/02* (2013.01)

(58) Field of Classification Search
CPC .............. H04W 12/106; H04W 4/40; H04W 12/041; H04W 76/27; H04W 80/02
(Continued)

(56) References Cited

U.S. PATENT DOCUMENTS

2011/0305339 A1\* 12/2011 Norrman ............... H04W 12/50
380/270
2015/0124708 A1\* 5/2015 Blankenship ......... H04W 36/08
370/329
(Continued)

FOREIGN PATENT DOCUMENTS

WO   WO-2018059866 A1 \*  4/2018  ........ H04W 12/0017

OTHER PUBLICATIONS

Vivo, "Consideration on SRB configuration in el TE," Presented At 3GPP TSG-RAN WG2 Meeting #99bis, Prague, Czech Republic, Oct. 9-13, 2017, 3 pages.
(Continued)

*Primary Examiner* — Bryan F Wright
(74) *Attorney, Agent, or Firm* — Fish & Richardson P.C.

(57) ABSTRACT

Provided is a method for changing, by a user equipment (UE), packet data convergence protocol (PDCP) version. The method may include: receiving a security mode command message, which includes a first security algorithm configuration for a PDCP of a first system and a second security algorithm configuration for a PDCP of a second system, from a base station (BS); deriving a first security key for the PDCP of the first system, based on the first security algorithm configuration; when the security mode command message passes an integrity protection check based on the first security key, changing the PDCP version from the PDCP of the first system to the PDCP of the second system; deriving a second security key for the PDCP of the second system, based on the second security algorithm configura-
(Continued)

tion; and transmitting a security mode complete message, based on the second security key, to the BS.

16 Claims, 15 Drawing Sheets

(51) Int. Cl.
*H04W 76/27* (2018.01)
*H04W 12/041* (2021.01)
*H04W 80/02* (2009.01)

(58) Field of Classification Search
USPC .......................................................... 726/26
See application file for complete search history.

(56) References Cited

U.S. PATENT DOCUMENTS

| | | |
|---|---|---|
| 2015/0358813 A1 | 12/2015 | Lee et al. |
| 2017/0215225 A1 | 7/2017 | Yi et al. |
| 2018/0092085 A1* | 3/2018 | Shaheen ................ H04W 76/16 |
| 2020/0092719 A1* | 3/2020 | Kim .................. H04W 12/0433 |
| 2020/0229259 A1* | 7/2020 | Teyeb ................... H04W 76/19 |

OTHER PUBLICATIONS

NEC, "Bearer setup at RRC connection for CP solution," at 3GPP TSG RAN2 NB-IOT Ad-hoc Meeting #2 Sophia Antipolis, France, May 3-4, 2016, 5 pages.
EP Extended European Search Report in European Appln. No. 18865655.7, dated Apr. 23, 2021, 9 pages.
Qualcomm Incorporated, "Considerations on PDCP version change", R2-1711672, 3GPP TSG-RAN WG2 Meeting #99bis, Prague, Czech Republic, Oct. 9-13, 2017, 2 pages.
Qualcomm Incorporated, "Security algorithms for NR PDCP at EN-DC capable eNB", R2-1711517, 3GPP TSG-RAN WG2 Meeting #99bis, Prague, Czech Republic, Oct. 9-13, 2017, 2 pages.
Samsung, "Lossless PDCP version change between LTE and NR", R2-1709028, 3GPP TSG-RAN WG2 Meeting #99, Berlin, Germany, Aug. 21-25, 2017, 3 pages.
Samsung, "PDCP operations during PDCP version change in EN-DC", R2-1711146, 3GPP TSG-RAN WG2 2017 RAN2#99bis Meeting, Prague, CZ, Oct. 9-13, 2017, 12 pages.

* cited by examiner

METHOD AND APPARATUS FOR ACTIVATING SECURITY AND CHANGING PDCP VERSION

CROSS-REFERENCE TO RELATED APPLICATIONS

This application is a National Stage application under 35 U.S.C. § 371 of International Application No. PCT/KR2018/011972, filed on Oct. 11, 2018, which claims the benefit of U.S. Provisional Application No. 62/571,165 filed on Oct. 11, 2017. The disclosures of the prior applications are incorporated by reference in their entirety.

BACKGROUND OF THE DISCLOSURE

Field of the Disclosure

The present invention relates to a wireless communication system, and more particularly, to a method for changing a packet data convergence protocol (PDCP) version and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

Meanwhile, in EN-DC, PDCP version change from LTE PDCP (i.e. E-UTRA PDCP) to NR PDCP or vice versa should be supported. In addition, considering handover scenario, PDCP version change between the LTE and the NR will be needed in MR-DC. Thus, a method for changing a PDCP version and an apparatus supporting the same need to be proposed.

SUMMARY OF THE DISCLOSURE

One embodiment provides a method for changing, by a user equipment (UE), packet data convergence protocol (PDCP) version. The method may include: receiving a security mode command message, which includes a first security algorithm configuration for a PDCP of a first system and a second security algorithm configuration for a PDCP of a second system, from a base station (BS); deriving a first security key for the PDCP of the first system, based on the first security algorithm configuration; when the security mode command message passes an integrity protection check based on the first security key, changing the PDCP version from the PDCP of the first system to the PDCP of the second system; deriving a second security key for the PDCP of the second system, based on the second security algorithm configuration; and transmitting a security mode complete message, based on the second security key, to the BS.

Another embodiment provides a method for receiving, by a base station (BS), a security mode complete message. The method may include: transmitting a security mode command message, which includes a first security algorithm configuration for a packet data convergence protocol (PDCP) of a first system and a second security algorithm configuration for a PDCP of a second system, to a user equipment (UE); and receiving the security mode complete message, based on a second security key for the PDCP of the second system, from the UE, wherein the second security key is derived based on the second security algorithm configuration, wherein PDCP version is changed by the UE from the PDCP of the first system to the PDCP of the second system, when the security mode command message passes an integrity protection check based on a first security key for the PDCP of the first system, and wherein the first security key is derived based on the first security algorithm configuration.

Another embodiment provides a user equipment (UE) changing packet data convergence protocol (PDCP) version. The UE may include: a memory; a transceiver; and a processor, connected to the memory and the transceiver, wherein the processor is configured to: control the transceiver to receive a security mode command message, which includes a first security algorithm configuration for a PDCP of a first system and a second security algorithm configuration for a PDCP of a second system, from a base station (BS); derive a first security key for the PDCP of the first system, based on the first security algorithm configuration; when the security mode command message passes an integrity protection check based on the first security key, change the PDCP version from the PDCP of the first system to the PDCP of the second system; derive a second security key for the PDCP of the second system, based on the second security algorithm configuration; and control the transceiver to transmit a security mode complete message, based on the second security key, to the BS.

PDCP version can be changed.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
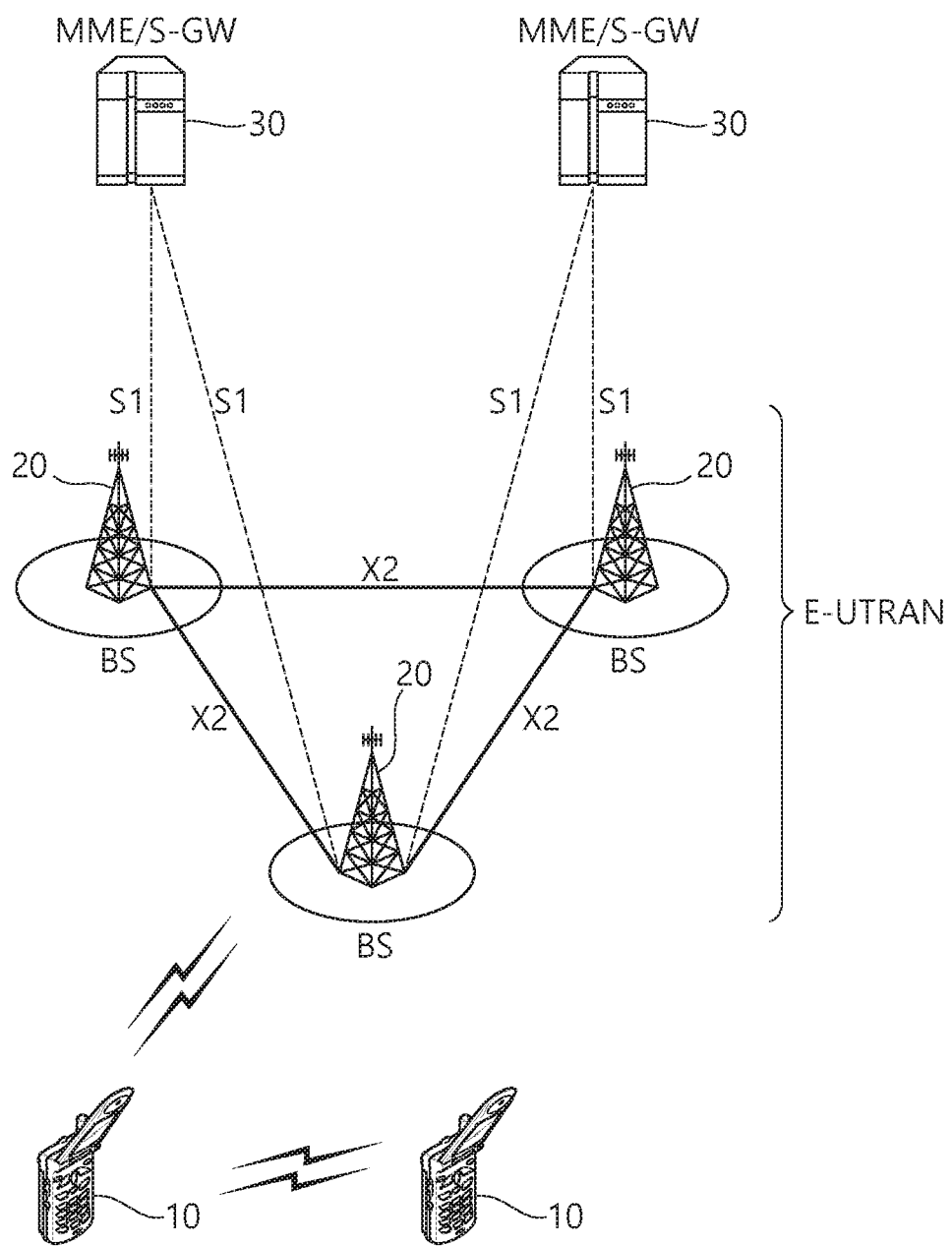
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
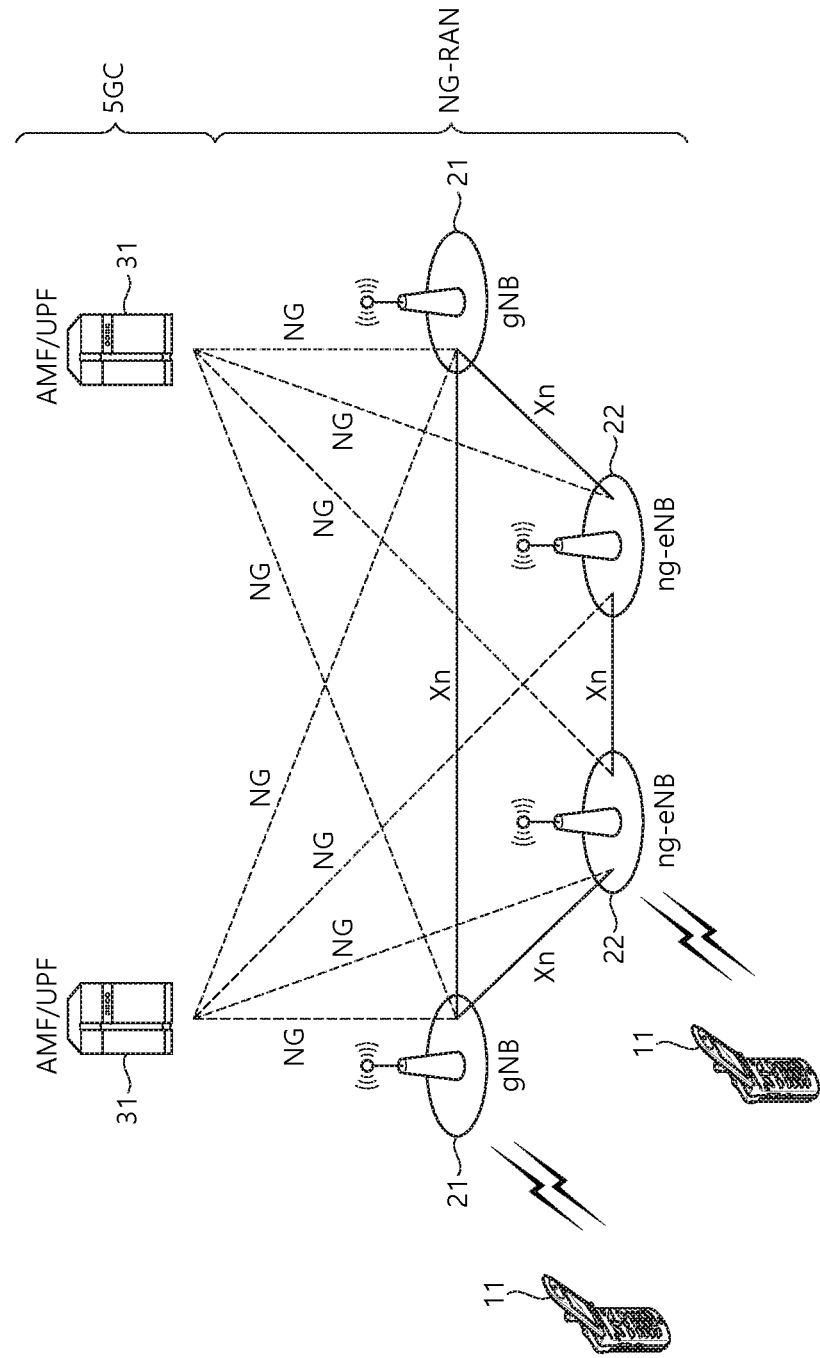
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
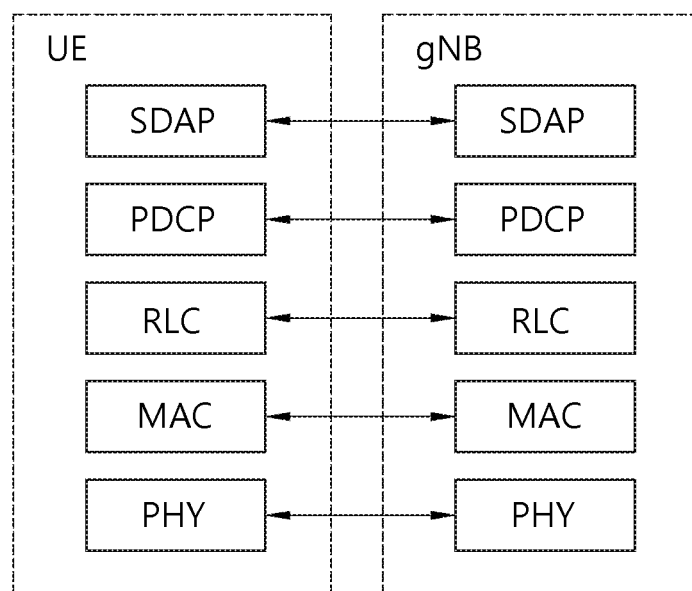
FIG. 3 shows a block diagram of a user plane protocol stack to which technical features of the present invention may be applied.
Figure 4:
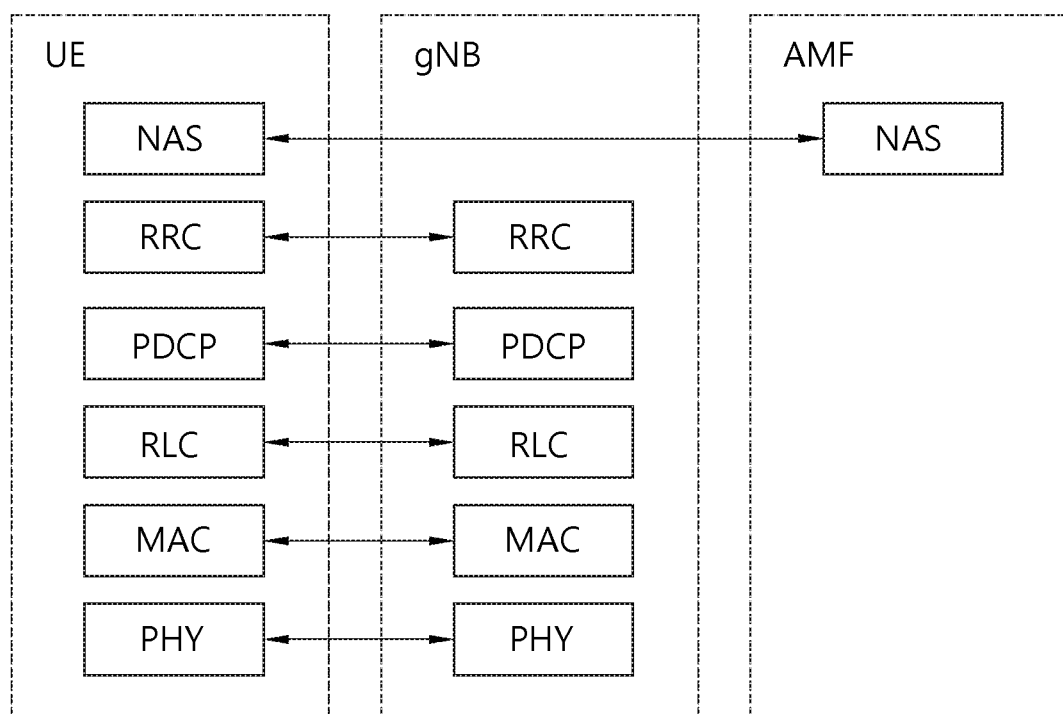
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
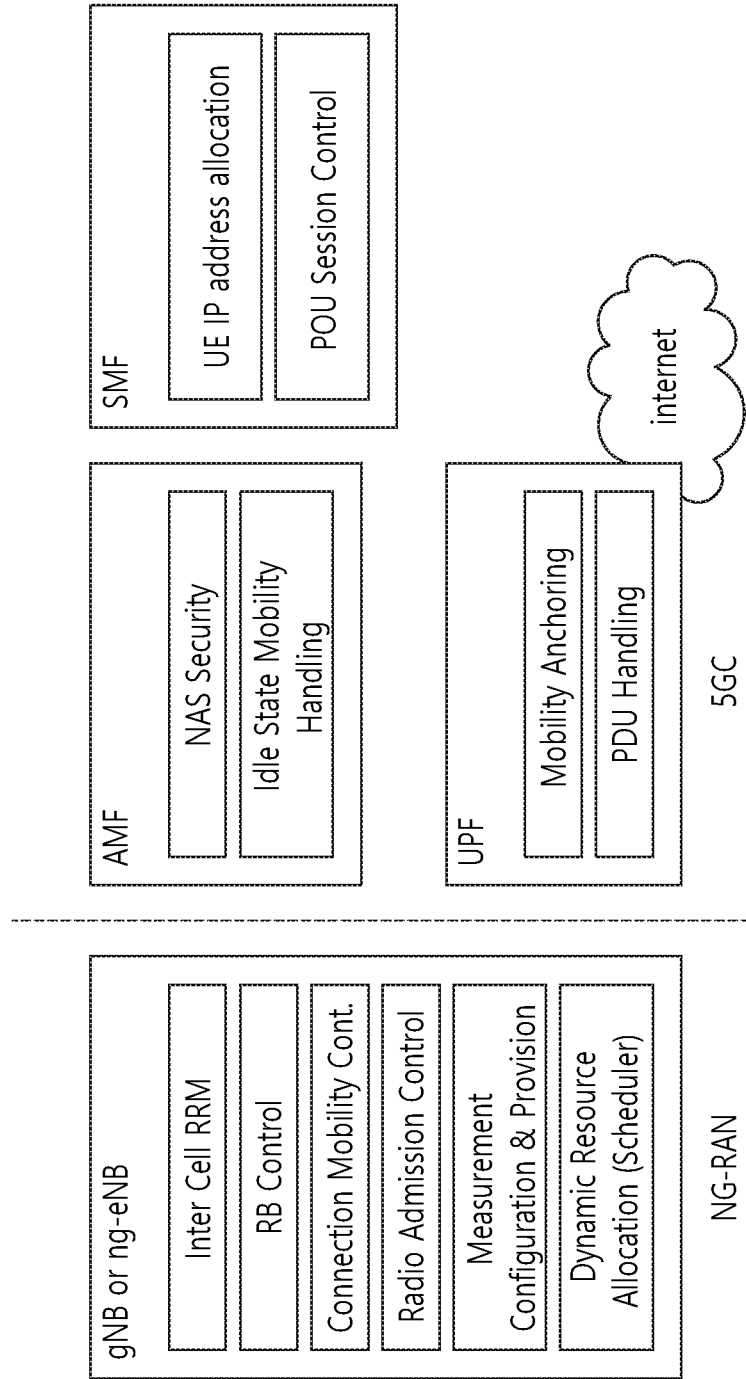
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or O&M);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) may host the following main functions:

NAS signalling termination;
NAS signalling security;
AS Security control;
Inter CN node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
SMF selection.

The User Plane Function (UPF) may host the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

The Session Management function (SMF) may host the following main functions:

Session Management;
UE IP address allocation and management;
Selection and control of UP function;
Configures traffic steering at UPF to route traffic to proper destination;
Control part of policy enforcement and QoS;
Downlink Data Notification.

Hereinafter, Multi-RAT Dual Connectivity (MR-DC) is described.

NG-RAN may support MR-DC operation whereby a UE in RRC_CONNECTED is configured to utilize radio resources provided by two distinct schedulers, located in two different NG-RAN nodes connected via a non-ideal backhaul and providing either E-UTRA (i.e. if the node is an ng-eNB) or NR access (i.e. if the node is a gNB). One node may act as the master node (MN) and the other as the secondary node (SN). The MN and SN may be connected via a network interface and at least the MN is connected to the core network.

Figure 6:
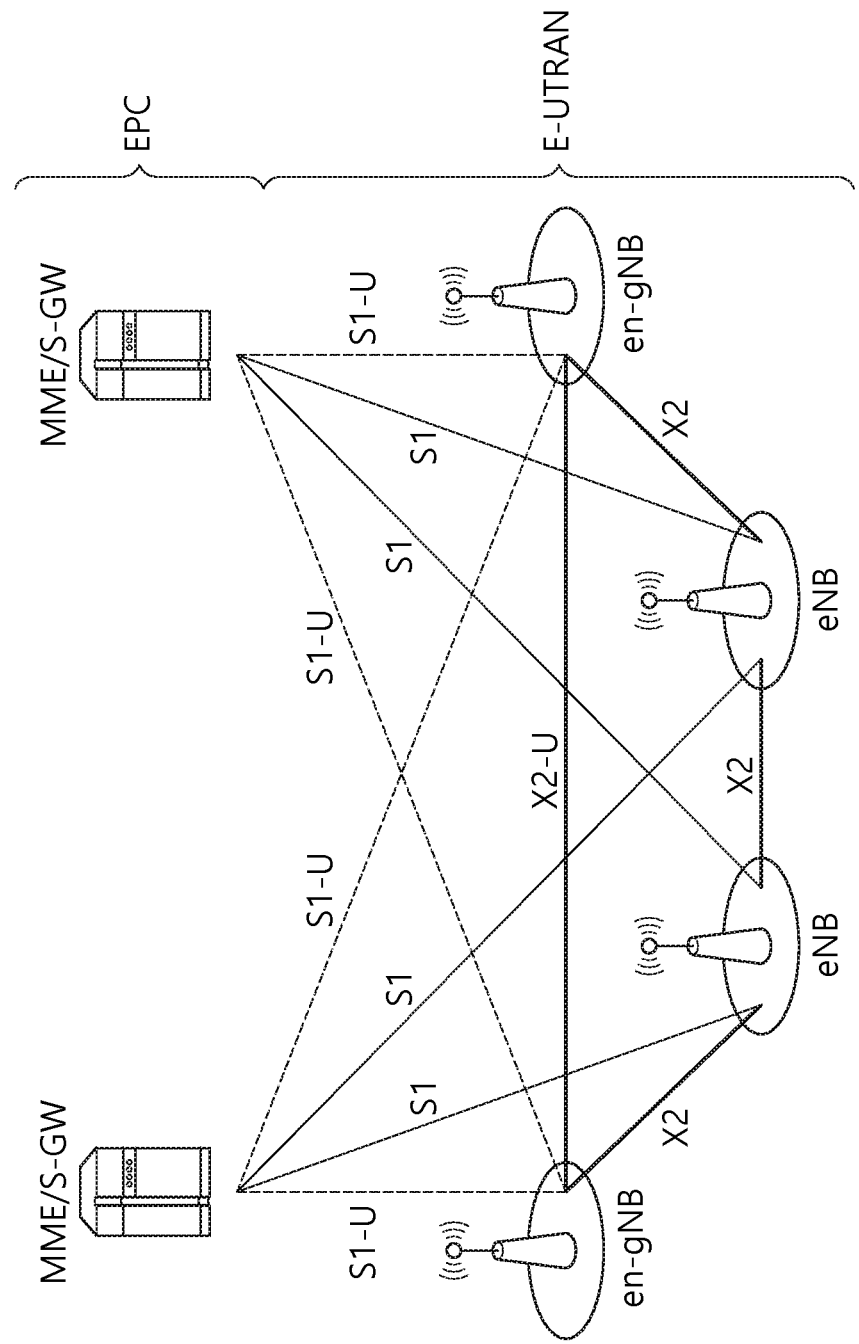
FIG. 6 shows architecture of MR-DC with the EPC to which technical features of the present invention may be applied.

FIG. 6 shows architecture of MR-DC with the EPC to which technical features of the present invention may be applied.

E-UTRAN may support MR-DC via E-UTRA-NR Dual Connectivity (EN-DC), in which a UE is connected to one eNB that acts as a MN and one en-gNB that acts as a SN. The eNB may be connected to the EPC via the S1 interface and to the en-gNB via the X2 interface. The en-gNB may also be connected to the EPC via the S1-U interface and other en-gNBs via the X2-U interface.

Furthermore, NG-RAN may support NG-RAN E-UTRA-NR Dual Connectivity (NGEN-DC), in which a UE is connected to one ng-eNB that acts as a MN and one gNB that acts as a SN. The ng-eNB is connected to the 5GC and the gNB is connected to the ng-eNB via the Xn interface. Furthermore, NG-RAN may support NR-E-UTRA Dual Connectivity (NE-DC), in which a UE is connected to one gNB that acts as a MN and one ng-eNB that acts as a SN. The gNB is connected to 5GC and the ng-eNB is connected to the gNB via the Xn interface.

In the dual connectivity, a set of serving cells may be newly defined below. A master cell group (MCG) may refer to a set of serving cells controlled by the macro BS (e.g. master eNB, master gNB, MeNB or MgNB) which is a BS controlling a primary cell (PCell), and a secondary cell group (SCG) may refer to a set of serving cells controlled by a secondary BS (e.g. secondary eNB, secondary gNB, SeNB or SgNB) which is not a BS controlling the PCell.

Hereinafter, security will be described.

Figure 7:
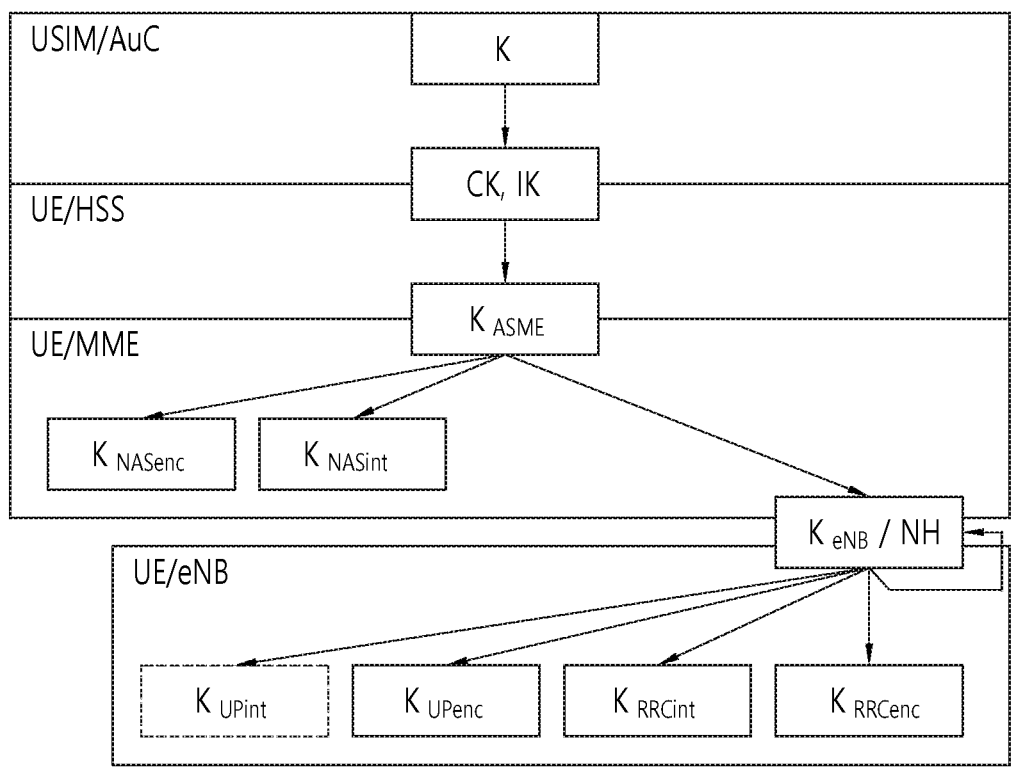
FIG. 7 is a diagram illustrating a general procedure of generating a security key.

FIG. 7 is a diagram illustrating a general procedure of generating a security key.

Referring to FIG. 7, the MME initiates an authentication and key agreement (AKA) procedure by requesting a home environment (HE) of authentication vectors. The HE responds to the MME through an authentication vector that includes a base key $K_{ASME}$. Accordingly, as a result of the AKA procedure, the EPC and the UE may share the base key $K_{ASME}$. NAS keys and parameters such as $K_{eNB}$ and NH (Next Hop) are generated from the base key $K_{ASME}$. Although the base key $K_{ASME}$ is not transferred to an entity outside the EPC, if the UE is shifted to the ECM-CONNECTED mode, the $K_{eNB}$ and NH may be transferred from the EPC to the eNB. The eNB and the UE may generate user plain (UP) keys and RRC keys from the parameter $K_{eNB}$. The UP keys and RRC keys may be updated during handover.

$K_{eNB*}$ may be generated by the UE and the source eNB from one of both a combination of target PCI (Physical Cell ID), target frequency and $K_{eNB}$ and a combination of target PCI, target frequency and NH. Afterwards, $K_{eNB*}$ refers to new $K_{eNB}$ used for RRC and UP traffic in a target cell. If the UE is shifted to the ECM-IDLE mode, all the keys are deleted from the eNB.

Security of the AS layer includes RRC signaling in the SRB and ciphering of user data in the DRB together with integrity protection for RRC signaling in the SRB. The RRC layer controls security configuration which is a part of AS configuration. In this case, the security configuration includes two parameters such as 'keyChangeIndicator' and 'nextHopChainingCount' together with an integrity protection algorithm and a ciphering algorithm. The security configuration is used when the UE determines the AS layer security key during handover and/or RRC connection re-establishment. In the meantime, the integrity protection algorithm is common to SRB1 and SRB2, and the ciphering algorithm is common to all the RBs, i.e., SRB1, SRB2 and DRB.

In more detail, the AS layer uses three different security keys, i.e., a key $K_{RRCint}$ for integrity protection of RRC signaling, a key $K_{RRCenc}$ for ciphering of RRC signaling, and a key $K_{UPenc}$ for ciphering of user data. These security keys are all generated from the parameter $K_{eNB}$. If RRC connection is established, since new AS layer security keys are generated from $K_{eNB}$, a new parameter for generating the keys is not required.

Integrity protection and ciphering of the RRC message for handover are performed by the source eNB on the basis of security configuration which is being used prior to handover. The integrity algorithm and the ciphering algorithm may be changed only after the handover is performed, and four AS layer security keys, i.e., $K_{eNB}$, $K_{RRCint}$, $K_{RRCenc}$ and $K_{UPenc}$ are changed per handover and RRC connection re-establishment.

The parameter 'keyChangeIndicator' is used during handover, and indicates whether the UE use security keys related to the most recent available key $K_{ASME}$. Also, the parameter 'nextHopChainingCount' is used when a new parameter $K_{eNB}$ is generated by the UE during handover and RRC connection re-establishment. An intra cell handover procedure may be used to change the security keys in the RRC connected mode.

In the meantime, if the RRC connected mode is shifted to the RRC idle mode, the eNB deletes security keys of the UE which is the RRC idle mode, and the keys are stored in the MME only. In other words, the eNB and the UE delete NH, $K_{eNB}$, $K_{RRCenc}$, $K_{RRCint}$ and $K_{UPenc}$, but the MME and the UE store $K_{ASME}$, $K_{NASint}$ and $K_{NAsenc}$.

Hereinafter, the initial security activity procedure will be described in more detail.

Figure 8:
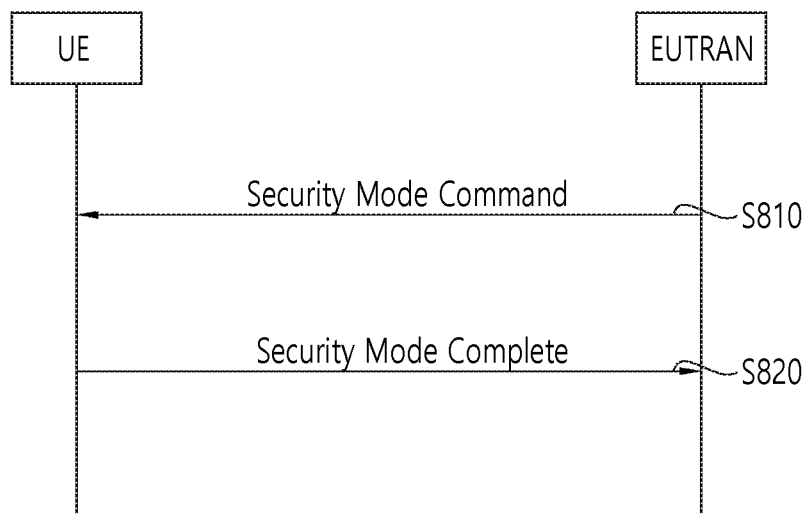
FIG. 8 shows a security activity procedure which is performed successfully.
Figure 9:
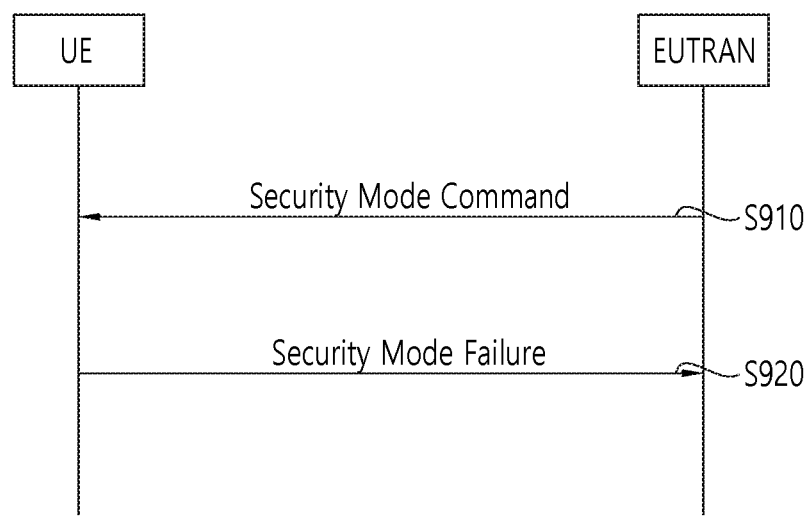
FIG. 9 shows a security activity procedure which is failed.

FIG. 8 shows a security activity procedure which is performed successfully, and FIG. 9 shows a security activity procedure which is failed.

Referring to FIG. 8 and FIG. 9, the E-UTRAN initiates the security activity procedure by transmitting a security mode command message to the UE which is in the RRC connected mode at step S810 and step S910. As described above, this step includes that SRB1 is only established, and corresponds to the step prior to SRB2 and DRB establishment.

If the security mode command message is received as illustrated in the steps S810 and S910, the UE generates the key $K_{eNB}$. Also, the UE generates a key $K_{RRCint}$ associated with the integrity protection algorithm indicated by the security mode command message.

Afterwards, the UE commands integrity protection of the security mode command message based on the integrity protection algorithm and the key $K_{RRCint}$. If the integrity protection of the security mode command message is performed successfully, keys $K_{RRCenc}$ and $K_{UPenc}$ associated with the ciphering algorithm indicated by the security mode command message are generated.

Afterwards, the UE commands the lower layer to perform integrity protection for the RRC messages, which include a security mode complete message, by using the integrity protection algorithm and the key $K_{RRCint}$ and at the same time is set to use the ciphering algorithm and the ciphering procedure based on the keys $K_{RRCenc}$ and $K_{UPenc}$.

After the above procedure is completed, it is regarded that the AS layer security is activated, and the UE ends the security activity procedure by transmitting the security mode complete message to the network as illustrated in step S820.

On the other hand, if the integrity protection of the security mode command message is failed, the UE uses configuration used prior to reception of the security mode command message. Also, the UE ends the security activity procedure by transmitting a security mode failure message to the network as illustrated in step S920.

Meanwhile, in EN-DC, PDCP version change from LTE PDCP (i.e. E-UTRA PDCP) to NR PDCP or vice versa should be supported. In addition, considering handover scenario, PDCP version change between the LTE and the NR will be needed in MR-DC. For EN-DC, since the UE uses LTE PDCP for SRB1 at the initial connection establishment from idle state, if a network wants to configure MCG/SCG split bearer for the UE, the network should perform reconfiguration for the PDCP version change. Similarly, the PDCP version change may be required when eLTE capable UE camps on the eLTE eNB. For instance, the term eLTE may be used to denote the E-UTRA connected to 5G-CN and eLTE eNB may be used to denote the eNB connected to 5G-CN in the specification.

During EN-DC operation, for instance, bearer type change between MCG bearer and other bearers is possible only if the NR PDCP version is used for MCG bearer. Thus, it is expected that most network will request PDCP version change to the UE at earliest time in order to do bearer type change at any time that the network wants. In addition, the PDCP version change is essential for the UE to be connected to eLTE. Thus, a method for changing a PDCP version and an apparatus supporting the same need to be proposed. Hereinafter, a method for changing the PDCP version and an apparatus supporting the same according to an embodiment of the present invention are described in detail.

Figure 10:
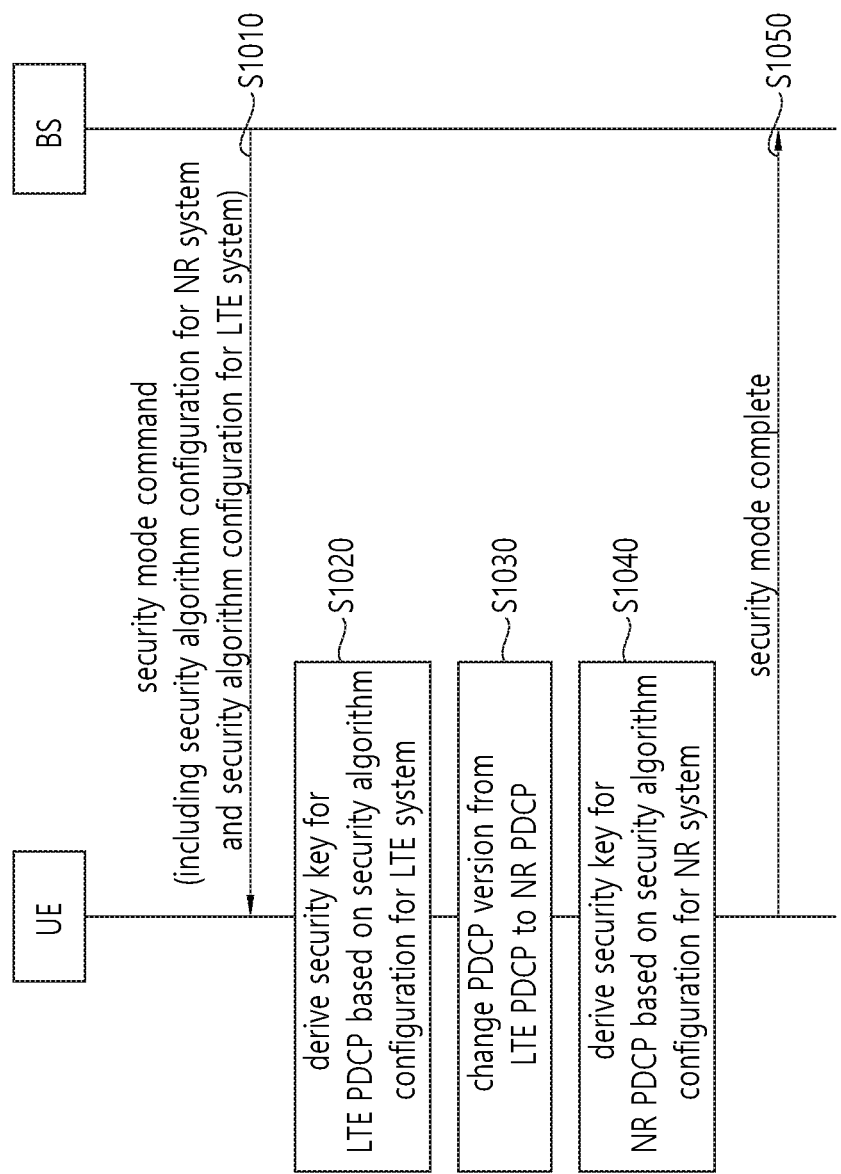
FIG. 10 shows a procedure for changing PDCP version according to an embodiment of the present invention.

FIG. 10 shows a procedure for changing PDCP version according to an embodiment of the present invention.

According to an embodiment of the present invention, PDCP version may be changed from LTE PDCP (i.e. E-UTRA PDCP) to NR PDCP during an initial security activation procedure. In the embodiment of FIG. 10, it is assumed that the UE uses the LTE PDCP for SRB1 at an initial connection establishment if the UE camps on an E-UTRA cell.

Referring to FIG. 10, in step S1010, the UE may receive a security mode command message from a base station. The base station may be an eNB. The security mode command message may include a security algorithm configuration for a LTE system and a security algorithm configuration for a NR system.

The security algorithm configuration for the LTE system may be used to configure AS integrity protection algorithm (SRBs) and AS ciphering algorithm (SRBs and DRBs). For instance, the security algorithm configuration for the LTE system may be defined as Table 1.

TABLE 1

```
SecurityAlgorithmConfig ::= SEQUENCE {
    cipheringAlgorithm      CipheringAlgorithm-r12,
    integrityProtAlgorithm  ENUMERATED {eia0-v920, eia1, eia2, eia3-v1130, spare4,
spare3, spare2, spare1, ...}
}
CipheringAlgorithm-r12 ::= ENUMERATED {eea0, eea1, eea2, eea3-v1130, spare4, spare3,
spare2, spare1, ...}
```

Referring to Table 1, the security algorithm configuration for the LTE system may include ciphering algorithm and integrity protection algorithm for the LTE system. The ciphering algorithm for the LTE system may indicate the ciphering algorithm to be used for SRBs and DRBs, and the integrity protection algorithm for the LTE system may indicate the integrity protection algorithm to be used for SRBs.

The security algorithm configuration for the NR system may be used to configure AS integrity protection algorithm (SRBs) and AS ciphering algorithm (SRBs and DRBs). For instance, the security algorithm configuration for the NR system may be defined as Table 2.

TABLE 2

```
SecurityAlgorithmConfig ::= SEQUENCE {
    cipheringAlgorithm   CipheringAlgorithm,
    integrityProtAlgorithm  IntegrityProtAlgorithm  OPTIONAL,  -- Need R
    ...
}
IntegrityProtAlgorithm ::= ENUMERATED {nia0, nia1, nia2, nia3, spare4, spare3, spare2,
spare1, ...}
CipheringAlgorithm ::= ENUMERATED {nea0, nea1, nea2, nea3, spare4, spare3, spare2,
spare1, ...}
```

Referring to Table 2, the security algorithm configuration for the NR system may include ciphering algorithm and integrity protection algorithm for the NR system. The ciphering algorithm for the NR system may indicate the ciphering algorithm to be used for SRBs and DRBs. The algorithms nea0-nea3 may be identical to the LTE algorithms eea0-3. For EN-DC, the algorithms configured for bearers using $K_{eNB}$ may be the same as for all bearers using $K_{eNB}$ and the algorithms configured for bearers using $K_{gNB}$ may be the same as for all bearers using $K_{gNB}$. For EN-DC, the integrity protection algorithm for the NR system may indicate the integrity protection algorithm to be used for SRBs. The algorithms nia0-nia3 may be identical to the LTE algorithms eia0-3. For EN-DC, the algorithms configured for SRBs using $K_{eNB}$ may be the same as for all SRBs using $K_{eNB}$ and the algorithms configured for bearers using $K_{gNB}$ may be the same as for all bearers using $K_{gNB}$.

In step S1020, if the UE receives the security mode command message which includes the security algorithm configuration for the NR system that indicates the ciphering algorithm and integrity protection algorithm to be used in NR PDCP, the UE may derive at least one security key for the LTE PDCP (e.g. $K_{eNB}$ key and $K_{RRCint}$ key for the LTE PDCP) with the integrity protection algorithm for the LTE system indicated in the security mode command message. The security key for the LTE PDCP may be derived by a RRC layer or the UE (i.e. UE RRC).

After deriving at least one security key, the UE may verify the integrity protection of the security mode command message, using the integrity protection algorithm for the LTE system indicated in the security mode command message and $K_{RRCint}$ key for the LTE PDCP. For instance, after deriving at least one security key, the UE RRC may request a PDCP layer of the UE (i.e. UE PDCP) to verify the integrity protection of the security mode command message, using the integrity protection algorithm for the LTE system indicated in the security mode command message and $K_{RRCint}$ key for the LTE PDCP.

In step S1030, the UE may change the LTE PDCP to the NR PDCP for all RBs if the security mode command message passes the integrity protection check by the UE PDCP (i.e. LTE PDCP). For this, the UE RRC may instruct the UE PDCP to re-establish the LTE PDCP to the NR PDCP for all RBs. In this case, the NR PDCP configuration may be a default value pre-configured or a received configuration from a network.

In step S1040, the UE may derive at least one security key for the NR PDCP (e.g. $K_{gNB}$ key and $K_{RRCint}$ key for the NR PDCP) with the integrity protection algorithm for the NR system. The security key for the NR PDCP may be derived by the UE RRC. The integrity protection algorithm for the NR system may be included in the security algorithm configuration for the NR system in the security mode command message.

Further, the UE may derive $K_{RRCenc}$ key and $K_{UPenc}$ key for the NR PDCP associated with the ciphering algorithm for the NR system indicated in the security mode command message. Also, the UE may derive $K_{UPint}$ key for the NR PDCP associated with the integrity protection algorithm for the NR system indicated in the security mode command message. For instance, based on the $K_{gNB}$ key and/or $K_{RRCint}$ key for the NR PDCP, the UE RRC may derive the $K_{RRCenc}$ key and the $K_{UPenc}$ key for the NR PDCP associated with the ciphering algorithm for the NR system, and the UE RRC may derive $K_{UPint}$ key for the NR PDCP associated with the integrity protection algorithm for the NR system.

In step S1050, The UE may apply integrity protection using the integrity protection algorithm for the NR system and the $K_{RRCint}$ key for the NR PDCP immediately, i.e. integrity protection shall be applied to all subsequent messages received and sent by the UE, including a security mode complete message. For this, the UE RRC may configure the UE PDCP (i.e. NR PDCP) to apply integrity protection using the indicated algorithm and the $K_{RRCint}$ key immediately including the security mode complete message. The integrity protection for the NR system may be applied to the security mode complete message sent by the UE.

Further, the may apply ciphering using the ciphering algorithm for the NR system and the $K_{RRCenc}$ key for the NR PDCP after completing the procedure, i.e. ciphering shall be applied to all subsequent messages received and sent by the UE, except for the security mode complete message which is sent unciphered. For this, the UE RRC may configure the UE PDCP (i.e. NR PDCP) to apply ciphering using the indicated algorithm, the $K_{RRCenc}$ key and the $K_{UPenc}$ key after completing the procedure except for the security mode complete message which is sent unciphered.

The UE (e.g. UE RRC) may consider AS security to be activated with the ciphering algorithm and integrity protection algorithm indicated in the security algorithm configuration for the NR system.

Meanwhile, returning to step S1010, if the UE receives the security mode command message which does not include the security algorithm configuration for the NR system, the UE (e.g. UE RRC) may perform legacy initial security activation procedure with the integrity protection algorithm for the LTE system indicated in the security mode command message.

This case will be occur when the eNB wants to change PDCP version from the LTE PDCP to the NR PDCP (e.g. eLTE eNB receives the CN type selection information from the UE as 5G-CN). After the initial security activation procedure above described, the UE will use the NR PDCP instead of the LTE PDCP. According to an embodiment of the present invention, the UE can change PDCP version in the initial security activation.

Figure 11:
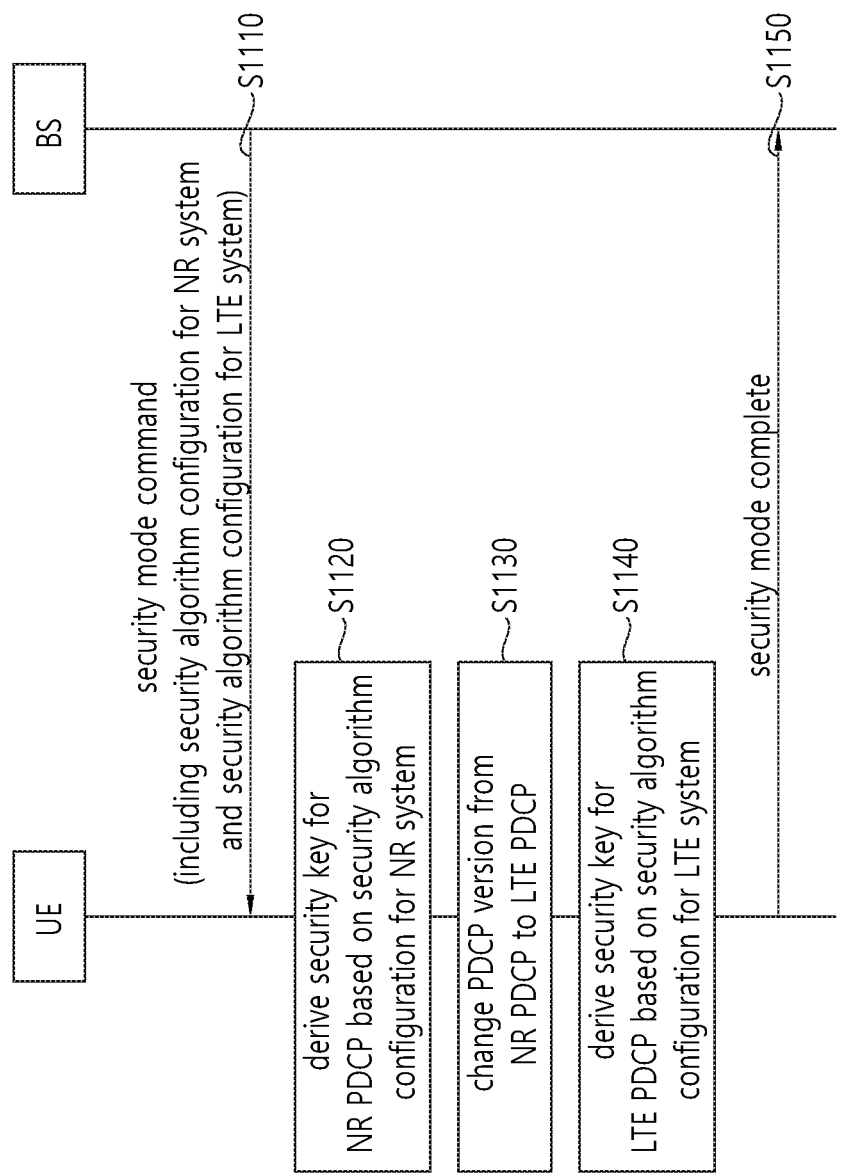
FIG. 11 shows a procedure for changing PDCP version according to an embodiment of the present invention.

FIG. 11 shows a procedure for changing PDCP version according to an embodiment of the present invention.

According to an embodiment of the present invention, PDCP version may be changed from the NR PDCP to the LTE PDCP (i.e. E-UTRA PDCP) during an initial security activation procedure. In the embodiment of FIG. 11, it is assumed that the UE uses the NR PDCP for SRB1 at an initial connection establishment if the UE camps on a NR cell.

Referring to FIG. 11, in step S1110, the UE may receive a security mode command message from a base station. The base station may be a gNB. The security mode command message may include a security algorithm configuration for a LTE system and a security algorithm configuration for a NR system.

In step S1120, if the UE receives the security mode command message which includes the security algorithm configuration for the LTE system that indicates the ciphering algorithm and integrity protection algorithm to be used in LTE PDCP, the UE may derive at least one security key for the NR PDCP (e.g. $K_{gNB}$ key and $K_{RRCint}$ key for the NR PDCP) with the integrity protection algorithm for the NR system indicated in the security mode command message. The security key for the NR PDCP may be derived by the UE RRC.

After deriving at least one security key, the UE may verify the integrity protection of the security mode command message, using the integrity protection algorithm for the NR system indicated in the security mode command message and $K_{RRCint}$ key for the NR PDCP. For instance, after deriving at least one security key, the UE RRC may request the UE PDCP to verify the integrity protection of the security mode command message, using the integrity protection algorithm for the NR system indicated in the security mode command message and $K_{RRCint}$ key for the NR PDCP.

In step S1130, the UE may change the NR PDCP to the LTE PDCP for all RBs if the security mode command message passes the integrity protection check by the UE PDCP (i.e. NR PDCP). For this, the UE RRC may instruct the UE PDCP to re-establish the NR PDCP to the LTE PDCP for all RBs. In this case, the LTE PDCP configuration may be a default value pre-configured or a received configuration from a network.

In step S1140, the UE may derive at least one security key for the LTE PDCP (e.g. $K_{eNB}$ key and $K_{RRCint}$ key for the LTE PDCP) with the integrity protection algorithm for the LTE system. The security key for the LTE PDCP may be derived by the UE RRC. The integrity protection algorithm for the LTE system may be included in the security algorithm configuration for the LTE system in the security mode command message.

Further, the UE may derive $K_{RRCenc}$ key and $K_{UPenc}$ key for the LTE PDCP associated with the ciphering algorithm for the LTE system indicated in the security mode command message. Also, the UE may derive $K_{UPint}$ key for the LTE PDCP associated with the integrity protection algorithm for the LTE system indicated in the security mode command message. For instance, based on the $K_{eNB}$ key and/or $K_{RRCint}$ key for the LTE PDCP, the UE RRC may derive the $K_{RRCenc}$ key and the $K_{UPenc}$ key for the LTE PDCP associated with the ciphering algorithm for the LTE system, and the UE RRC may derive $K_{UPint}$ key for the LTE PDCP associated with the integrity protection algorithm for the LTE system.

In step S1150, The UE may apply integrity protection using the integrity protection algorithm for the LTE system and the $K_{RRCint}$ key for the LTE PDCP immediately, i.e. integrity protection shall be applied to all subsequent messages received and sent by the UE, including a security mode complete message. For this, the UE RRC may configure the UE PDCP (i.e. LTE PDCP) to apply integrity protection using the indicated algorithm and the $K_{RRCint}$ key immediately including the security mode complete message. The integrity protection for the LTE system may be applied to the security mode complete message sent by the UE.

Further, the may apply ciphering using the ciphering algorithm for the LTE system and the $K_{RRCenc}$ key for the LTE PDCP after completing the procedure, i.e. ciphering shall be applied to all subsequent messages received and sent by the UE, except for the security mode complete message which is sent unciphered. For this, the UE RRC may configure the UE PDCP (i.e. LTE PDCP) to apply ciphering using the indicated algorithm, the $K_{RRCenc}$ key and the $K_{UPenc}$ key after completing the procedure except for the security mode complete message which is sent unciphered.

The UE (e.g. UE RRC) may consider AS security to be activated with the ciphering algorithm and integrity protection algorithm indicated in the security algorithm configuration for the LTE system.

Meanwhile, returning to step S1110, if the UE receives the security mode command message which does not include the security algorithm configuration for the LTE system, the UE (e.g. UE RRC) may perform NR initial security activation procedure with the integrity protection algorithm for the NR system indicated in the security mode command message.

This case will be occur when the gNB wants to change PDCP version from the NR PDCP to the LTE PDCP (e.g. en-gNB receives the CN type selection information from the UE as 4G-CN). After the initial security activation procedure above described, the UE will use the LTE PDCP instead of the NR PDCP. According to an embodiment of the present invention, the UE can change PDCP version in the initial security activation.

Figure 12:
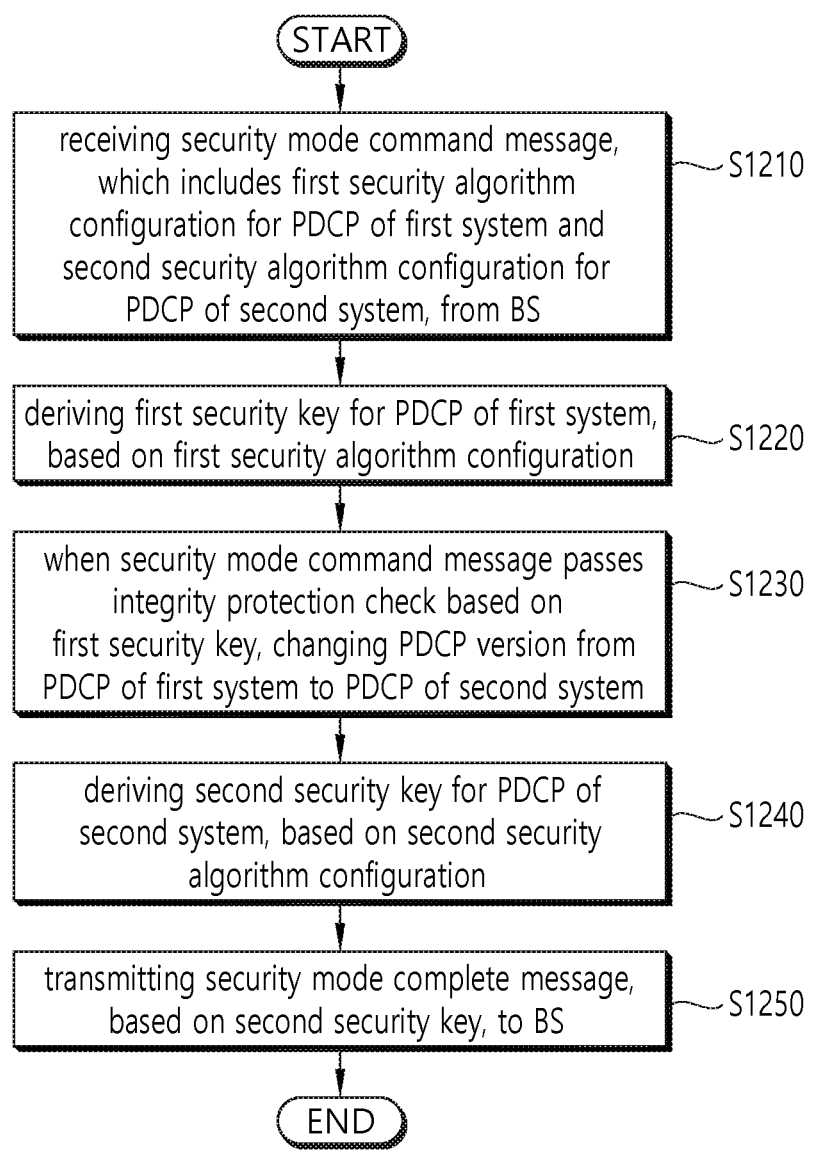
FIG. 12 shows a method for changing PDCP version by a UE according to an embodiment of the present invention.

FIG. 12 shows a method for changing PDCP version by a UE according to an embodiment of the present invention. The present invention described above for UE side may be applied to this embodiment.

Referring to FIG. 12, in step S1210, the UE may receive a security mode command message, which includes a first security algorithm configuration for a PDCP of a first system and a second security algorithm configuration for a PDCP of a second system, from a BS. The PDCP of the first system may be used by the UE in an initial connection establishment procedure.

In step S1220, the UE may derive a first security key for the PDCP of the first system, based on the first security algorithm configuration.

In step S1230, the UE may change the PDCP version from the PDCP of the first system to the PDCP of the second system, when the security mode command message passes an integrity protection check based on the first security key. The PDCP version may be changed from the PDCP of the first system to the PDCP of the second system, when a RRC layer of the UE informs a PDCP layer of the UE about re-establishing the PDCP of the first system to the PDCP of the second system for at least one radio bearer (RB). A configuration of the PDCP of the second system may be a pre-configured default value. Alternatively, a configuration of the PDCP of the second system may be received from a network.

In step S1240, the UE may derive a second security key for the PDCP of the second system, based on the second security algorithm configuration.

In step S1250, the UE may transmit a security mode complete message, based on the second security key, to the BS.

For instance, the first system may be a long-term evolution (LTE) system, and the second system may be a NR system. In this case, the first security algorithm configuration may include a ciphering algorithm and an integrity protection algorithm for the PDCP of the LTE system, and the second security algorithm configuration may include a ciphering algorithm and an integrity protection algorithm for the PDCP of the NR system. The first security key may be at least one of $K_{eNB}$ key and/or $K_{RRCint}$ key for the PDCP of the LTE system, and the second security key may be at least one of $K_{gNB}$ key, $K_{RRCint}$ key for the PDCP of the NR system, $K_{RRCenc}$ key for the PDCP of the NR system and/or $K_{UPenc}$ key for the PDCP of the NR system.

For instance, the first system may be a NR system, and the second system may be a long-term evolution (LTE) system. In this case, the first security algorithm configuration may include a ciphering algorithm and an integrity protection algorithm for the PDCP of the NR system, and the second security algorithm configuration may include a ciphering algorithm and an integrity protection algorithm for the PDCP of the LTE system. The first security key may be at least one of $K_{gNB}$ key and/or $K_{RRCint}$ key for the PDCP of the NR system, and the second security key may be at least one of $K_{eNB}$ key, $K_{RRCint}$ key for the PDCP of the LTE system, $K_{RRCenc}$ key for the PDCP of the LTE system and/or $K_{UPenc}$ key for the PDCP of the LTE system.

According to an embodiment of the present invention, the BS can inform the UE about the PDCP version change in the initial security activation, and the UE can change the PDCP version in the initial security activation.

Figure 13:
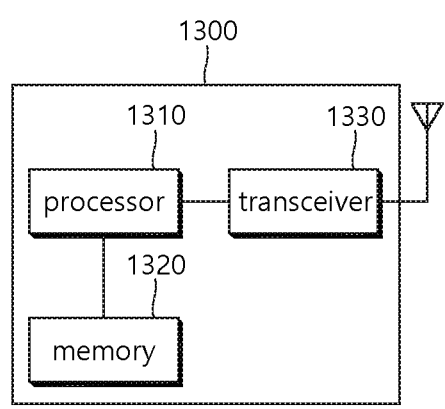
FIG. 13 shows a UE to implement an embodiment of the present invention.

FIG. 13 shows a UE to implement an embodiment of the present invention. The present invention described above for UE side may be applied to this embodiment.

A UE 1300 includes a processor 1310, a memory 1320 and a transceiver 1330. The processor 1310 may be configured to implement proposed functions, procedures and/or methods described in this description. Layers of the radio interface protocol may be implemented in the processor 1310.

Specifically, the processor 1310 may control the transceiver 1330 to receive a security mode command message, which includes a first security algorithm configuration for a PDCP of a first system and a second security algorithm configuration for a PDCP of a second system, from a BS. The PDCP of the first system may be used by the UE in an initial connection establishment procedure.

Further, the processor 1310 may derive a first security key for the PDCP of the first system, based on the first security algorithm configuration.

Further, the processor 1310 may change the PDCP version from the PDCP of the first system to the PDCP of the second system, when the security mode command message passes an integrity protection check based on the first security key. The PDCP version may be changed from the PDCP of the first system to the PDCP of the second system, when a RRC layer of the UE informs a PDCP layer of the UE about re-establishing the PDCP of the first system to the PDCP of the second system for at least one radio bearer (RB). A configuration of the PDCP of the second system may be a pre-configured default value. Alternatively, a configuration of the PDCP of the second system may be received from a network.

Further, the processor 1310 may derive a second security key for the PDCP of the second system, based on the second security algorithm configuration.

Further, the processor 1310 may control the transceiver 1330 to transmit a security mode complete message, based on the second security key, to the BS.

For instance, the first system may be a long-term evolution (LTE) system, and the second system may be a NR system. In this case, the first security algorithm configuration may include a ciphering algorithm and an integrity protection algorithm for the PDCP of the LTE system, and the second security algorithm configuration may include a ciphering algorithm and an integrity protection algorithm for the PDCP of the NR system. The first security key may be at least one of $K_{eNB}$ key and/or $K_{RRCint}$ key, and the second security key may be at least one of $K_{gNB}$ key, $K_{RRCint}$ key, $K_{RRCenc}$ key and/or $K_{UPenc}$ key.

For instance, the first system may be a NR system, and the second system may be a long-term evolution (LTE) system. In this case, the first security algorithm configuration may include a ciphering algorithm and an integrity protection algorithm for the PDCP of the NR system, and the second security algorithm configuration may include a ciphering algorithm and an integrity protection algorithm for the PDCP of the LTE system. The first security key may be at least one of $K_{gNB}$ key and/or $K_{RRCint}$ key, and the second security key may be at least one of $K_{eNB}$ key, $K_{RRCint}$ key, $K_{RRCenc}$ key and/or $K_{UPenc}$ key.

The memory 1320 is operatively coupled with the processor 1310 and stores a variety of information to operate the processor 1310. The transceiver 1330 is operatively coupled with the processor 1310, and transmits and/or receives a radio signal.

Figure 14:
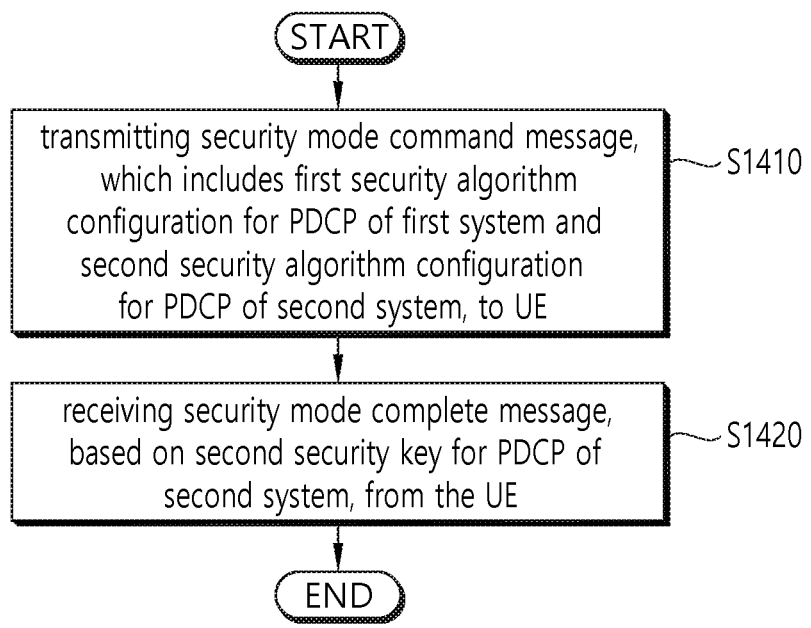
FIG. 14 shows a method for supporting to change PDCP version by a BS according to an embodiment of the present invention.

FIG. 14 shows a method for supporting to change PDCP version by a BS according to an embodiment of the present invention. The present invention described above for BS side may be applied to this embodiment.

Referring to FIG. 14, in step S1410, the BS may transmit a security mode command message, which includes a first security algorithm configuration for a packet data convergence protocol (PDCP) of a first system and a second security algorithm configuration for a PDCP of a second system, to a user equipment (UE). A PDCP version may be changed by the UE from the PDCP of the first system to the PDCP of the second system, when the security mode command message passes an integrity protection check based on a first security key for the PDCP of the first system. The first security key may be derived based on the first security algorithm configuration. The PDCP of the first system may be used by the UE in an initial connection establishment procedure. A configuration of the PDCP of the second system may be a pre-configured default value. Alternatively, a configuration of the PDCP of the second system may be received from a network.

In step S1420, the BS may receive the security mode complete message, based on a second security key for the PDCP of the second system, from the UE. The second security key may be derived based on the second security algorithm configuration, For instance, the first system may be a long-term evolution (LTE) system, and the second system may be a NR system. In this case, the first security algorithm configuration may include a ciphering algorithm and an integrity protection algorithm for the PDCP of the LTE system, and the second security algorithm configuration may include a ciphering algorithm and an integrity protection algorithm for the PDCP of the NR system. The first security key may be at least one of $K_{eNB}$ key and/or $K_{RRCint}$ key, and the second security key may be at least one of $K_{gNB}$ key, $K_{RRCint}$ key, $K_{RRCenc}$ key and/or $K_{UPenc}$ key.

For instance, the first system may be a NR system, and the second system may be a long-term evolution (LTE) system. In this case, the first security algorithm configuration may include a ciphering algorithm and an integrity protection algorithm for the PDCP of the NR system, and the second security algorithm configuration may include a ciphering algorithm and an integrity protection algorithm for the PDCP of the LTE system. The first security key may be at least one of $K_{gNB}$ key and/or $K_{RRCint}$ key, and the second security key may be at least one of $K_{eNB}$ key, $K_{RRCint}$ key, $K_{RRCenc}$ key and/or $K_{UPenc}$ key.

Figure 15:
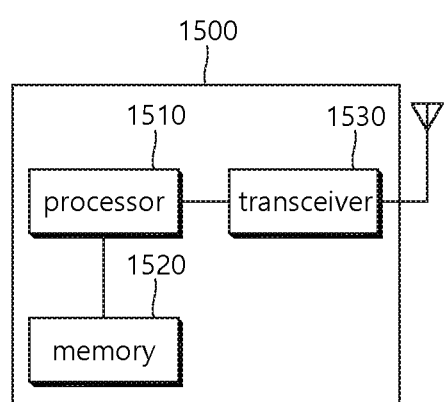
FIG. 15 shows a BS to implement an embodiment of the present invention.

FIG. 15 shows a BS to implement an embodiment of the present invention. The present invention described above for BS side may be applied to this embodiment.

A BS 1500 includes a processor 1510, a memory 1520 and a transceiver 1530. The processor 1510 may be configured to implement proposed functions, procedures and/or methods described in this description. Layers of the radio interface protocol may be implemented in the processor 1510.

Specifically, the processor 1510 may control the transceiver 1530 to transmit a security mode command message, which includes a first security algorithm configuration for a packet data convergence protocol (PDCP) of a first system and a second security algorithm configuration for a PDCP of a second system, to a user equipment (UE). A PDCP version may be changed by the UE from the PDCP of the first system to the PDCP of the second system, when the security mode command message passes an integrity protection check based on a first security key for the PDCP of the first system. The first security key may be derived based on the first security algorithm configuration. The PDCP of the first system may be used by the UE in an initial connection establishment procedure. A configuration of the PDCP of the second system may be a pre-configured default value. Alternatively, a configuration of the PDCP of the second system may be received from a network.

Further, the processor 1510 may control the transceiver 1530 to receive the security mode complete message, based on a second security key for the PDCP of the second system, from the UE. The second security key may be derived based on the second security algorithm configuration, For instance, the first system may be a long-term evolution (LTE) system, and the second system may be a NR system. In this case, the first security algorithm configuration may include a ciphering algorithm and an integrity protection algorithm for the PDCP of the LTE system, and the second security algorithm configuration may include a ciphering algorithm and an integrity protection algorithm for the PDCP of the NR system. The first security key may be at least one of $K_{eNB}$ key and/or $K_{RRCint}$ key, and the second security key may be at least one of $K_{gNB}$ key, $K_{RRCint}$ key, $K_{RRCenc}$ key and/or $K_{UPenc}$ key.

For instance, the first system may be a NR system, and the second system may be a long-term evolution (LTE) system. In this case, the first security algorithm configuration may include a ciphering algorithm and an integrity protection algorithm for the PDCP of the NR system, and the second security algorithm configuration may include a ciphering algorithm and an integrity protection algorithm for the PDCP of the LTE system. The first security key may be at least one of $K_{gNB}$ key and/or $K_{RRCint}$ key, and the second security key may be at least one of $K_{eNB}$ key, $K_{RRCint}$ key, $K_{RRCenc}$ key and/or $K_{UPenc}$ key.

The memory 1520 is operatively coupled with the processor 1510 and stores a variety of information to operate the processor 1510. The transceiver 1530 is operatively coupled with the processor 1510, and transmits and/or receives a radio signal.

The processor 1310, 1510 may include an application-specific integrated circuit (ASIC), a separate chipset, a logic circuit, and/or a data processing unit. The memory 1320, 1520 may include a read-only memory (ROM), a random access memory (RAM), a flash memory, a memory card, a storage medium, and/or other equivalent storage devices. The transceiver 1330, 1530 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 1310, 1510. The memory 1320, 1520 may be located inside or outside the processor 1310, 1510, and may be coupled to the processor 1310, 1510 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) for activating security and changing packet data convergence protocol (PDCP) version, the method comprising:
   receiving a security mode command message, which includes a first security algorithm configuration for a PDCP of a first system and a second security algorithm configuration for a PDCP of a second system, from a base station (BS),
   wherein the first system is different from the second system,
   wherein the first security algorithm configuration includes a first ciphering algorithm for the PDCP of the first system and a first integrity protection algorithm for the PDCP of the first system, and
   wherein the second security algorithm configuration includes a second ciphering algorithm for the PDCP of the second system and a second integrity protection algorithm for the PDCP of the second system;
   deriving a first security key for the PDCP of the first system, based on the first security algorithm configuration,
   wherein the first security key includes $K_{RRCint}$ key related to the first integrity protection algorithm included in the security mode command message;
   verifying integrity protection of the security mode command message, based on the first integrity protection algorithm included in the security mode command message and based on the first security key including the $K_{RRCint}$ key related to the first integrity protection algorithm included in the security mode command message,
   based on the security mode command message passing the verification of the integrity protection, changing the PDCP version from the PDCP of the first system to the PDCP of the second system;
   deriving a second security key for the PDCP of the second system, based on the second security algorithm configuration; and
   transmitting a security mode complete message, based on the second security key, to the BS.

2. The method of claim 1, wherein the first system is a long-term evolution (LTE) system, and the second system is a NR system.

3. The method of claim 2, wherein the first security algorithm configuration includes a ciphering algorithm and an integrity protection algorithm for the PDCP of the LTE system, and the second security algorithm configuration includes a ciphering algorithm and an integrity protection algorithm for the PDCP of the NR system.

4. The method of claim 2, wherein the first security key is at least one of $K_{eNB}$ key and/or $K_{RRCint}$ key for the PDCP of the LTE system, and the second security key is at least one of $K_{gNB}$ key, $K_{RRCint}$ key for the PDCP of the NR system, $K_{RRCenc}$ key and/or $K_{UPenc}$ key.

5. The method of claim 1, wherein the first system is a NR system, and the second system is a long-term evolution (LTE) system.

6. The method of claim 5, wherein the first security algorithm configuration includes a ciphering algorithm and an integrity protection algorithm for the PDCP of the NR system, and the second security algorithm configuration includes a ciphering algorithm and an integrity protection algorithm for the PDCP of the LTE system.

7. The method of claim 5, wherein the first security key is at least one of $K_{gNB}$ key and/or $K_{RRCint}$ key for the PDCP of the NR system, and the second security key is at least one of $K_{eNB}$ key, $K_{RRCint}$ key for the PDCP of the LTE system, $K_{RRCenc}$ key and/or $K_{UPenc}$ key.

8. The method of claim 1, wherein the PDCP version is changed from the PDCP of the first system to the PDCP of the second system, when a RRC layer of the UE informs a PDCP layer of the UE about re-establishing the PDCP of the first system to the PDCP of the second system for at least one radio bearer (RB).

9. The method of claim 1, wherein a configuration of the PDCP of the second system is a pre-configured default value.

10. The method of claim 1, wherein a configuration of the PDCP of the second system is received from a network.

11. The method of claim 1, wherein the PDCP of the first system is used by the UE in an initial connection establishment procedure.

12. A method for receiving, by a base station (BS), a security mode complete message, the method comprising:
transmitting a security mode command message, which includes a first security algorithm configuration for a packet data convergence protocol (PDCP) of a first system and a second security algorithm configuration for a PDCP of a second system, to a user equipment (UE),
wherein the first system is different from the second system,
wherein the first security algorithm configuration includes a first ciphering algorithm for the PDCP of the first system and a first integrity protection algorithm for the PDCP of the first system, and
wherein the second security algorithm configuration includes a second ciphering algorithm for the PDCP of the second system and a second integrity protection algorithm for the PDCP of the second system; and
receiving the security mode complete message, based on a second security key for the PDCP of the second system, from the UE,
wherein the second security key is derived based on the second security algorithm configuration,
wherein PDCP version is changed by the UE from the PDCP of the first system to the PDCP of the second system, based on the security mode command message passing the verification of the integrity protection, changing the PDCP version from the PDCP of the first system to the PDCP of the second system,
wherein an integrity protection of the security mode command message is verified, based on the first integrity protection algorithm included in the security mode command message and based on a first security key including a $K_{RRCint}$ key related to the first integrity protection algorithm included in the security mode command message,
wherein the first security key is derived based on the first security algorithm configuration, and
wherein the first security key includes the $K_{RRCint}$ key related to the first integrity protection algorithm included in the security mode command message.

13. The method of claim 12, wherein the first system is a long-term evolution (LTE) system, and the second system is a NR system.

14. The method of claim 12, wherein the first system is a NR system, and the second system is a long-term evolution (LTE) system.

15. A user equipment (UE) configured to activate security and change packet data convergence protocol (PDCP) version, the UE comprising:
a memory; a transceiver; and
a processor, connected to the memory and the transceiver, wherein the processor is configured to:
control the transceiver to receive a security mode command message, which includes a first security algorithm configuration for a PDCP of a first system and a second security algorithm configuration for a PDCP of a second system, from a base station (BS),
wherein the first system is different from the second system,
wherein the first security algorithm configuration includes a first ciphering algorithm for the PDCP of the first system and a first integrity protection algorithm for the PDCP of the first system, and
wherein the second security algorithm configuration includes a second ciphering algorithm for the PDCP of the second system and a second integrity protection algorithm for the PDCP of the second system;
derive a first security key for the PDCP of the first system, based on the first security algorithm configuration,
wherein the first security key includes $K_{RRCint}$ key related to the first integrity protection algorithm included in the security mode command message;
verify integrity protection of the security mode command message, based on the first integrity protection algorithm included in the security mode command message and based on the first security key including the $K_{RRCint}$ key related to the first integrity protection algorithm included in the security mode command message,
based on the security mode command message passing the verification of the integrity protection, change the PDCP version from the PDCP of the first system to the PDCP of the second system;
derive a second security key for the PDCP of the second system, based on the second security algorithm configuration; and
control the transceiver to transmit a security mode complete message, based on the second security key, to the BS.

16. The method of claim 1, wherein the UE communicates with at least one of a mobile terminal, a network or autonomous vehicles other than the UE.

* * * * *